US009342833B2

(12) United States Patent
Mathew et al.

(10) Patent No.: US 9,342,833 B2
(45) Date of Patent: May 17, 2016

(54) METHOD OF AGGREGATING BUSINESS AND SOCIAL NETWORKS

(75) Inventors: Ashvin J. Mathew, Kirkland, WA (US); Christopher S. Hargarten, Seattle, WA (US); Navid Azimi-Garakani, Redmond, WA (US); Carlos Carvallo, Sammamish, WA (US); Gerry M. Tierney, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1558 days.

(21) Appl. No.: 12/146,126

(22) Filed: Jun. 25, 2008

(65) Prior Publication Data

US 2009/0327427 A1    Dec. 31, 2009

(51) Int. Cl.
| | | |
|---|---|---|
| *G06F 15/16* | (2006.01) | |
| *G06Q 30/02* | (2012.01) | |
| *G06Q 50/00* | (2012.01) | |
| *G06Q 10/10* | (2012.01) | |
| *H04L 12/58* | (2006.01) | |

(52) U.S. Cl.
CPC .............. *G06Q 30/02* (2013.01); *G06Q 50/01* (2013.01); *G06Q 10/10* (2013.01); *H04L 12/588* (2013.01)

(58) Field of Classification Search
CPC ....... G06Q 30/02; G06Q 50/01; G06Q 10/10; H04L 12/588
USPC .......................................................... 709/204
See application file for complete search history.

(56) References Cited

U.S. PATENT DOCUMENTS

| | | |
|---|---|---|
| 7,188,153 B2 | 3/2007 | Lunt et al. |
| 2005/0171799 A1 | 8/2005 | Hull et al. |
| 2005/0273378 A1 | 12/2005 | MacDonald-Korth et al. |
| 2006/0026033 A1 | 2/2006 | Brydon et al. |
| 2006/0042483 A1* | 3/2006 | Work ..................... G06Q 10/00 101/91 |
| 2006/0190536 A1 | 8/2006 | Strong et al. |
| 2006/0242581 A1 | 10/2006 | Manion et al. |

(Continued)

OTHER PUBLICATIONS

"The XING Guided Tour," http://www.xing.com/app/help?op=tour;page=1 [last accessed Nov. 10, 2008].

(Continued)

*Primary Examiner* — Jude Jean Gilles
*Assistant Examiner* — Jaren M Means
(74) *Attorney, Agent, or Firm* — Thomas Marquis; Kate Drakos; Micky Minhas (57) ABSTRACT

A method and system for facilitating relationships across multiple networks is described. The meta-network includes relationship information describing users, the networks to which such users belong, and the relationships that they have established within such networks. When a relationship is established in a network, it can be used to propagate relationships across any number of networks with the same or different users. The meta-network enhances the users' ability to search for information and manage their relationships across multiple networks. A user can search for other users according to one or more user-specified attributes. One or more users satisfying the user-specified attributes are identified, and a similarity measure may be determined for each of the identified users. A mapping interface is displayed to the user to enable the user to visually compare the identified users having a similarity measure within the displayed range. The mapping interface allows the user to invite one or more of the displayed users to establish a relationship with the user.

21 Claims, 12 Drawing Sheets

(56) References Cited

U.S. PATENT DOCUMENTS

| | | |
|---|---|---|
| 2007/0250585 A1 | 10/2007 | Ly et al. |
| 2008/0052288 A1 | 2/2008 | Flinn et al. |
| 2008/0059576 A1* | 3/2008 | Liu .................. G06Q 10/10 709/204 |
| 2008/0104079 A1* | 5/2008 | Craig .................. H04L 37/306 |
| 2008/0134052 A1* | 6/2008 | Davis .................. G06Q 10/10 715/744 |
| 2009/0177744 A1* | 7/2009 | Marlow .................. G06Q 10/10 709/204 |
| 2010/0274815 A1* | 10/2010 | Vanasco .................. G06F 17/30867 707/798 |

OTHER PUBLICATIONS

Eldon, Eric, "LinkedIn Launches Platform—A Better Business Social Network," Dec. 9, 2007, http://venturebeat.com/2007/12/09/linkedin-launches-platform-redesign-a-better-business-social-network/ [last accessed Nov. 10, 2008].

O'Murchu, Ina et al., "Online Social and Business Networking Communities," http://ftp.informatik.rwth-aachen.de/Publications/CEUR-WS/Vol-107/paper2.pdf [last accessed Nov. 10, 2008].

* cited by examiner

METHOD OF AGGREGATING BUSINESS AND SOCIAL NETWORKS

BACKGROUND

Computers increasingly serve as tools through which people interact and communicate with each other. As a result, many types of networks have developed to facilitate communication. Such network types include, for example, social networks, dating networks, business networks, education networks, commerce networks, political networks, and so forth. Typically, such networks are formed through an initial set of users who invite other users to join their network. For example, after registering with a social network (e.g., Facebook) and creating an account, a user, Jill, may invite her college friends to join the social network. As another example, after registering with a business Network (e.g., LinkedIn) and creating an account, Jill may also invite her business partners to join the business network. Thus, Jill would use the social network when dealing with social issues, and use the business network when dealing with business issues.

People often have both social and business relationships with the same person. For example, Jack, a classmate of Jill, may have previously accepted an invitation from Jill to join the social network and to establish a social relationship with her. Some years later, when Jill starts doing business with Jack, Jill would also like to establish a business relationship with Jack through the business network. Jill could invite Jack to also join the business network and to establish a business relationship with her. If Jack accepts, then they both belong to two separate networks with a relationship in each network. If Jill and Jack share other similar interests (e.g., environmental, political, or religious), then they may want to establish relationships in other type of networks.

As relationships between people evolve over time and accounts and relationships established with multiple networks, it can be difficult for a person to identify such relationships, to track the people with whom the person has established relationships, and to communicate those people. For example, Jill may need to log on to three different networks, each with different user interfaces, to compile a list of all persons with whom Jill has an established relationship. If Jill has a relationship established with Jack in a social network and Jack has an account in a business network, Jill may not even know of Jack's business or that a business relationship may be mutually beneficial. Thus, even though two people have a relationship established in one network, they may not be aware that they both have an interest and an account in another network (e.g., a political network). In such a case, the people may never become aware that they share such a common interest.

SUMMARY

A meta-network is provided that stores information describing users, the networks to which such users belong, and relationships established in such networks between users. The meta-network facilitates establishing relationships across multiple networks. That is, when a relationship is established in one network, it can be used to propagate relationships in other networks between the same or different users. In some embodiments, the meta-network enables users to search for other users according to one or more specified attributes. Users matching the specified attributes may be identified, and a similarity measure may be determined for each of the identified users. In some embodiments, a mapping interface based on the determined similarity measures is displayed to enable the user to visually compare the identified users having a similarity measure within the specified attribute range.

This Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

DETAILED DESCRIPTION

A meta-network is provided that stores information describing users registered with the meta-network, the other networks to which such users belong, and relationships established in such networks between users. As described herein, the meta-network facilitates establishing relationships across multiple networks. When a relationship is established in one network, it can be used to propagate relationships in other networks between the same or different users. A user can create an account with a meta-network and supply their business, social, and other account information to the meta-network. Thus, the meta-network maps each meta-network user to the user's other accounts. For example, Jill may establish a meta-network account indicating that she has accounts with a business network, a social network, and an environmental network. Jack may similarly establish a meta-network account indicating that he also has accounts with each of the same three networks. The meta-network also tracks relationships between registered users of the meta-network. For example, Jill may establish a relationship with Jack in the meta-network. The meta-network uses the established relationship between two people in the meta-network and knowledge of each of their other accounts to provide to one person the list of networks of the other person, and vice versa. Thus, Jill, who previously only had a social relationship with Jack via the social network, will become aware, after establishing a relationship with Jack in the meta-network, that Jack also belongs to a business network and an environmental network. Jill can then seek to establish relationships with Jack in each of the other networks.

In some embodiments, an existing network (e.g., business network) can be adapted to provide the functionality of the meta-network using its existing account and relationship infrastructure. In such a case, the existing network would be adapted to provide users, who are registered with the network, information about the users' other accounts. That is, the existing network may include a management application that maintains information describing the other networks to which the registered users belong and the relationships such users have established in those networks.

In some embodiments, the meta-network enables users to search for other users according to one or more specified attributes. For example, Jill may desire to search for wholesale suppliers of flour within a 25 mile radius of her bakery. It may also be very important to Jill that the suppliers only use organic wheat. Users matching the attributes specified by Jill may be identified, and a similarity measure may be determined for each of the identified users to indicate how closely they satisfy Jill's search. For example, the meta-network may identify Jack as matching Jill's search because when Jack registered with the business network he provided a variety of information describing his business, including the type of business (e.g., wholesale supplier), the products sold (e.g., organic wheat), the location, etc. In some embodiments, a mapping interface based on the determined similarity measures is displayed to enable the user to visually compare the identified users having a similarity measure within the specified attribute range.

Figure 1A:
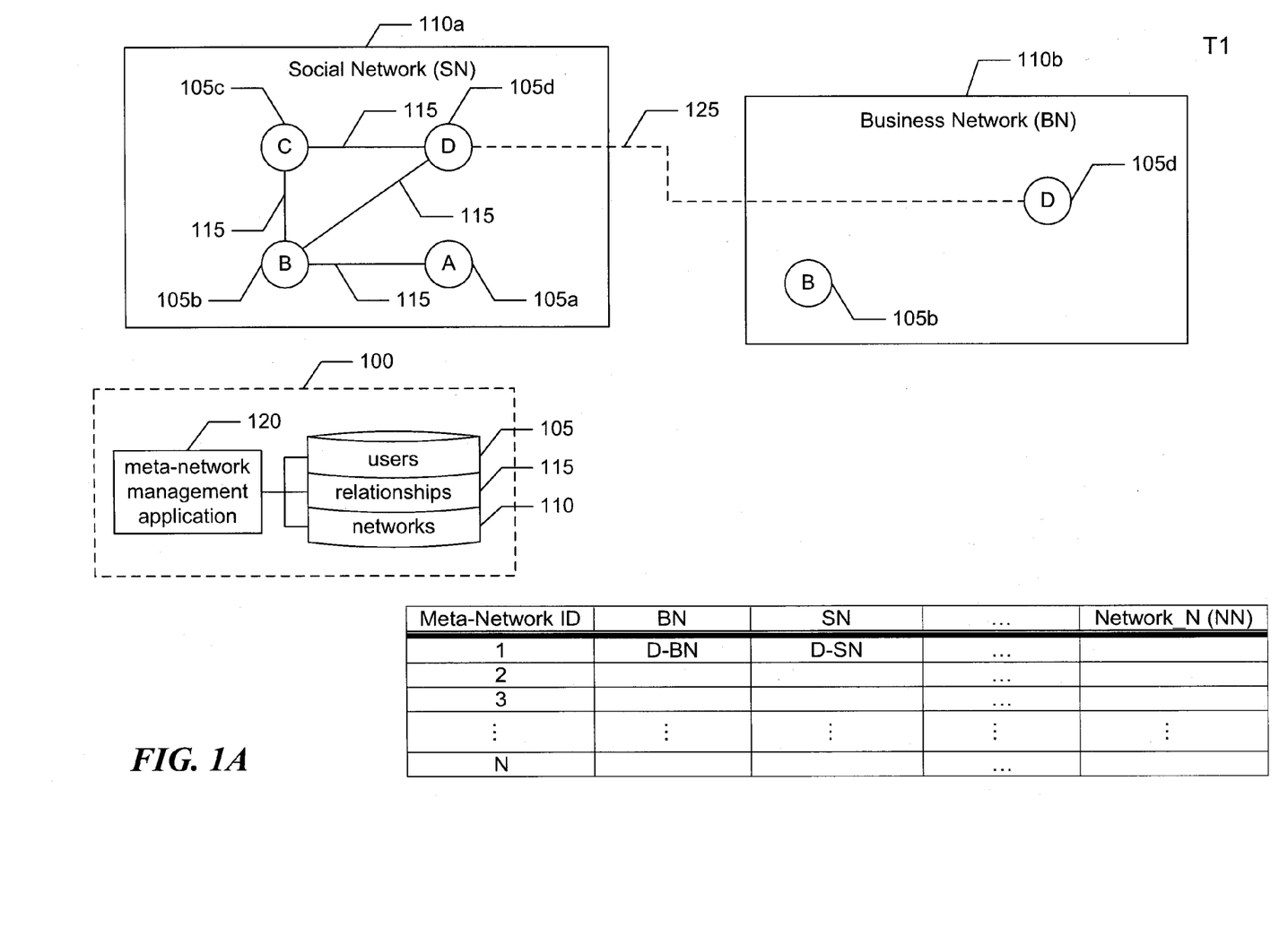
FIGS. 1A, 1B, and 1C are block diagrams that illustrate a user registering with the meta-network and establishing relationships with other users in one embodiment.
Figure 1B:
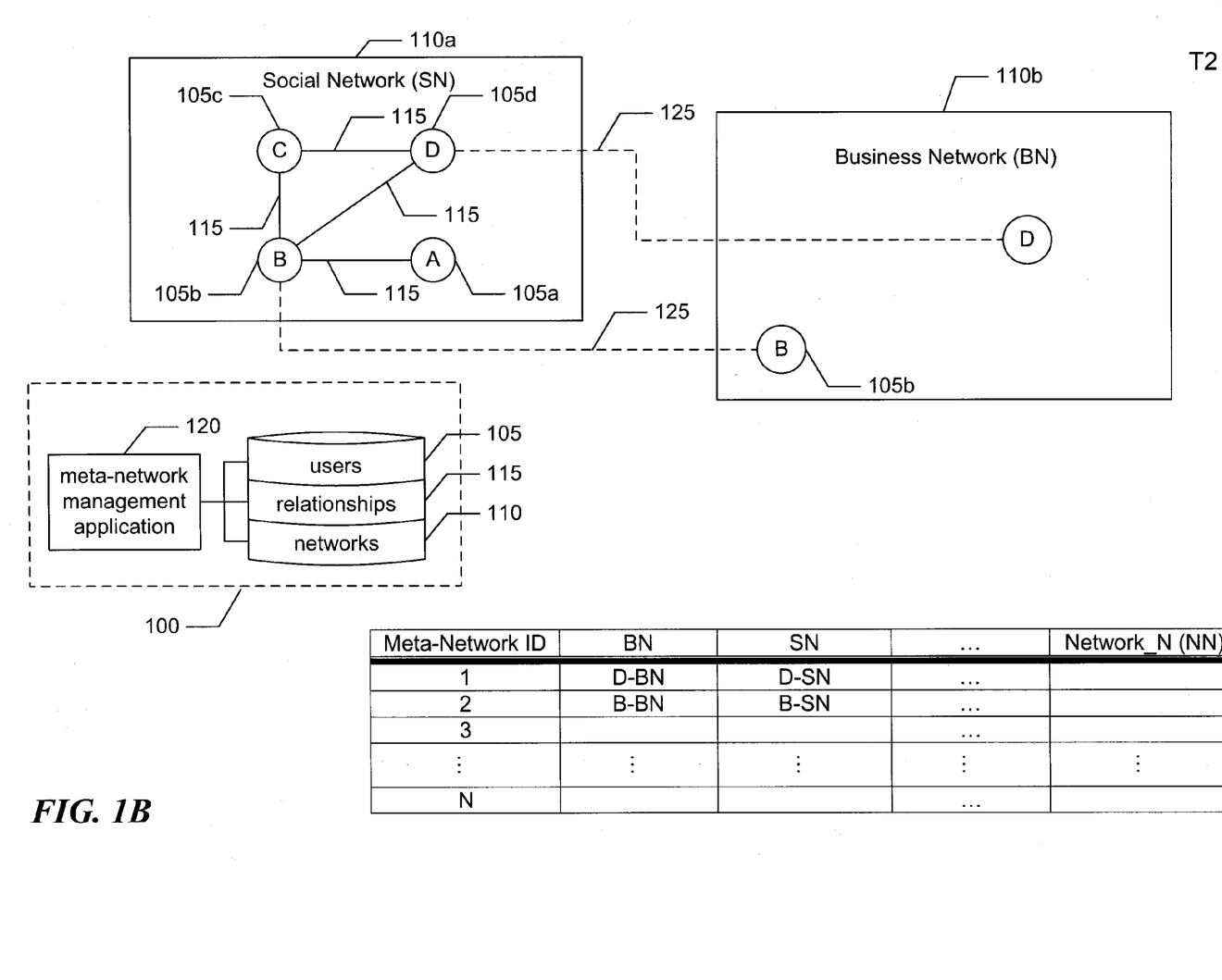
Figure 1C:
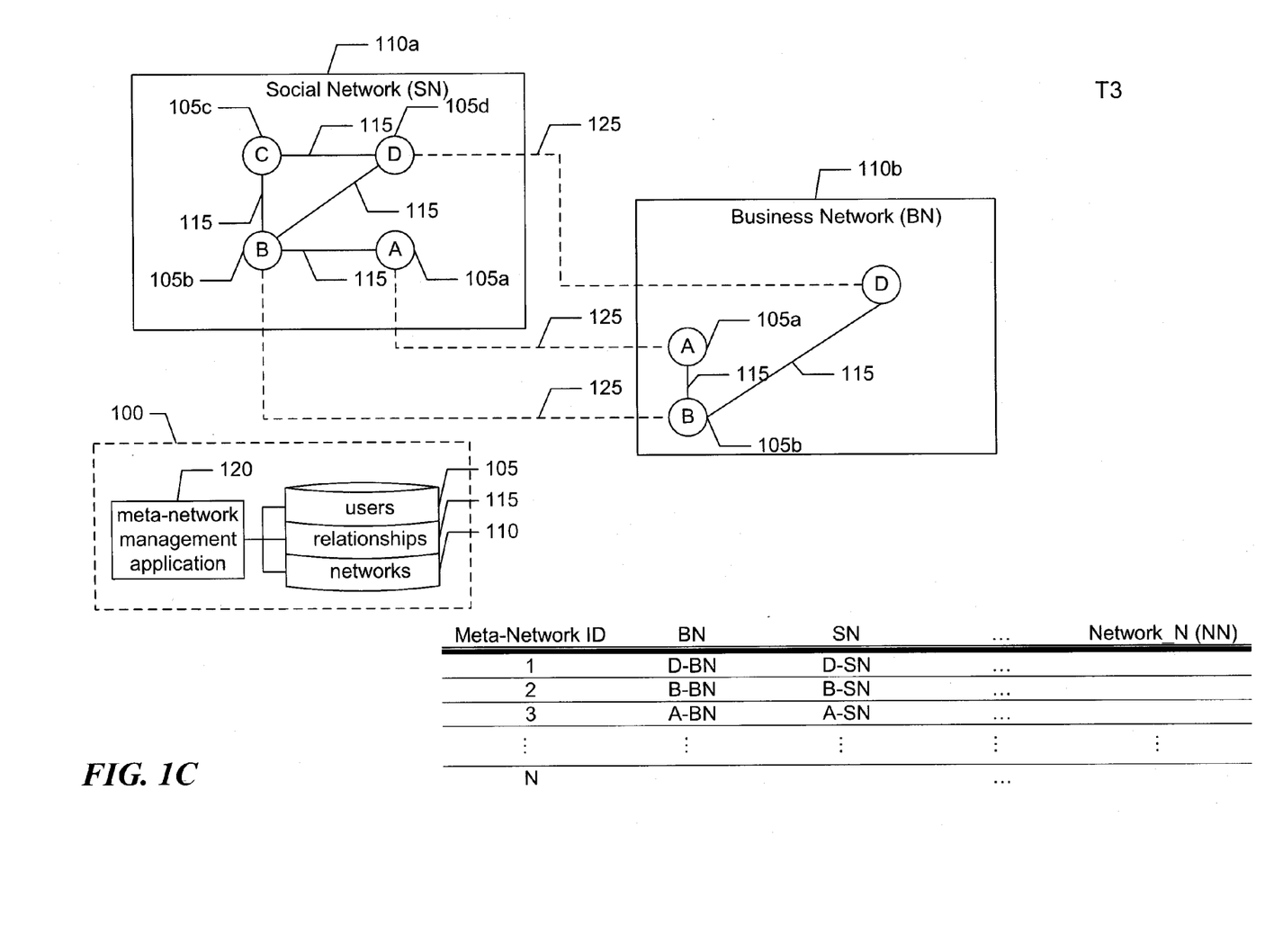

Before describing the meta-network in greater detail, it is useful to consider an environment in which the meta-network may be implemented. FIGS. 1A, 1B, and 1C are block diagrams that illustrate a user registering with the meta-network and establishing relationships with other users in one embodiment. A meta-network 100 stores information describing registered users 105, the networks 110 to which such registered users belong, and the relationships 115 established in such networks between users. Although two networks 110a and 110b are illustrated, it will be appreciated by those skilled in the art that there may be any number of networks 110 may be included. Although the meta-network 100 in FIGS. 1A-C is shown as a separate network with which users register independent of networks 110a and 110b, in some embodiments, one of the networks 110 functions as the meta-network.

In some embodiments, the meta-network 100 includes a management application 120 that maintains information describing registered users 105, the networks 110 to which such registered users belong, and the relationships 115 established in such networks between users. The management application 120 enables users 105 to establish relationships with the meta-network. The management application 120 may include a search tool that enables users 105 to search for other registered users according to one or more specified attributes. The meta-network 100 may include other applications or tools not mentioned here.

As illustrated in FIG. 1A, at time T1 users 105d and 105c are registered with the meta-network 100. When a user registers with the meta-network 100, the user is assigned a meta-network identifier ("ID") that is used to map the user's network IDs. For example, as shown in table 130a of FIG. 1A, user 105d is assigned meta-network ID 1, which is mapped to the business network identifier of user 105d ("D-BN") and social network identifier of user 105d ("D-SN"). To facilitate description, a dashed line 125 is used to illustrate in FIGS. 1A-C that a user 105 is registered with the meta-network 100.

As illustrated in FIG. 1B, at time T2, users 105b, 105c, and 105d are registered with the meta-network 100. When user 105b registers with the meta-network 100, the business network identifier of user 105b ("B-BN") is mapped to the assigned meta-network ID. The user 105b may have provided its business network 110b identifier to the meta-network 100. Alternatively, if the business network 110b is adapted to implement the meta-network 100, the business network will already know the business network identifier of user 105b.

After a user 105 registers with the meta-network, the user may register other network IDs of the user with the meta-network 100. For example, after user 105b registers with the meta-network, user 105b may register his or her social network ID ("B-SN") with the meta-network. As shown in table 130b of FIG. 1B, user 105b is assigned meta-network ID 2, which is mapped to the business network identifier of user 105b ("B-BN") and social network identifier of user 105b ("B-SN").

In some embodiments, when a user registers a network ID with the meta-network, the meta-network identifies the users 105 with which that user has established a relationship. To identify such users, the meta-network invokes a relationship API exposed by the network 110. For example, when user 105b registers his or her social network ID ("B-SN") with the meta-network, the meta-network invokes the relationship API of the social network 110a to identify the users (i.e., 105a, 105c, and 105d) with which user 105b has established a relationship.

After a user 105 has registered each of the user's network IDs with the meta-network, the user may invite other users to establish a relationship with the user in any of the user's networks 110. For example, user 105b may invite user 105a and 105d to establish a relationship with user 105b in the business network 110b. To invite users 105a and 105d, the meta-network invokes the invitation API exposed by the business network 110b. If user 105d accepts the invitation, the meta-network stores an indication of the established relationship. For user 105a to accept the invitation, however, user 105a registers with the meta-network 100 and the business network 110b. As illustrated in FIG. 1C, at time T3, users 105a and 105d have accepted user 105b's invitation to establish a relationship in the business network 110b.

Figure 2:
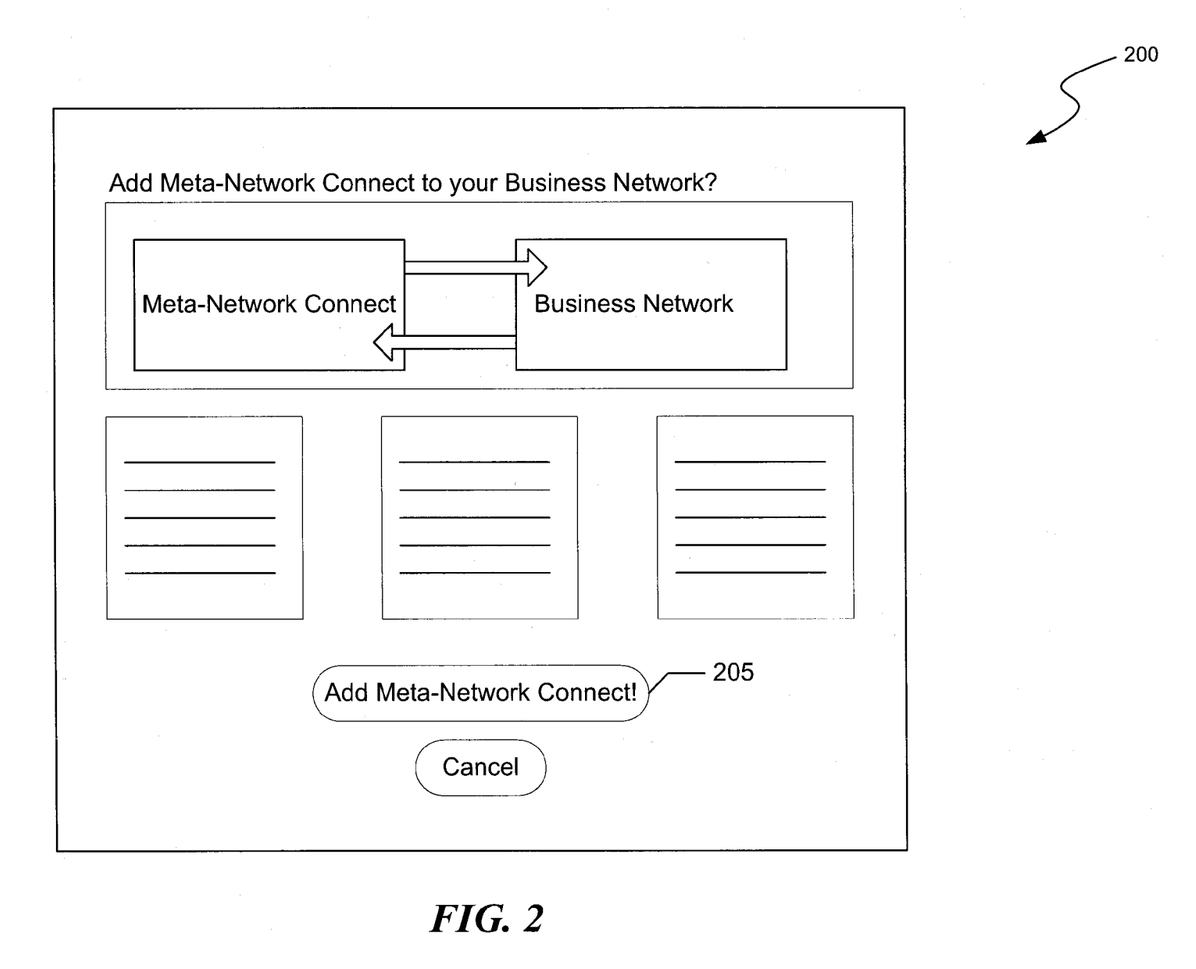
FIG. 2 illustrates a sample user interface presented to a user to initiate the meta-network registration process in one embodiment.

FIG. 2 illustrates a sample user interface 200 that may be presented to a user to initiate a meta-network registration process. For example when user 105b logs into business network 110b, he or she may be presented with an opportunity to add a meta-network connection ("meta-connect") interface to her business network by registering with the meta-network 100. In some embodiments, the meta-connect interface is added to the user's network 110 as a web part, a tab, or a page.

Figure 3:
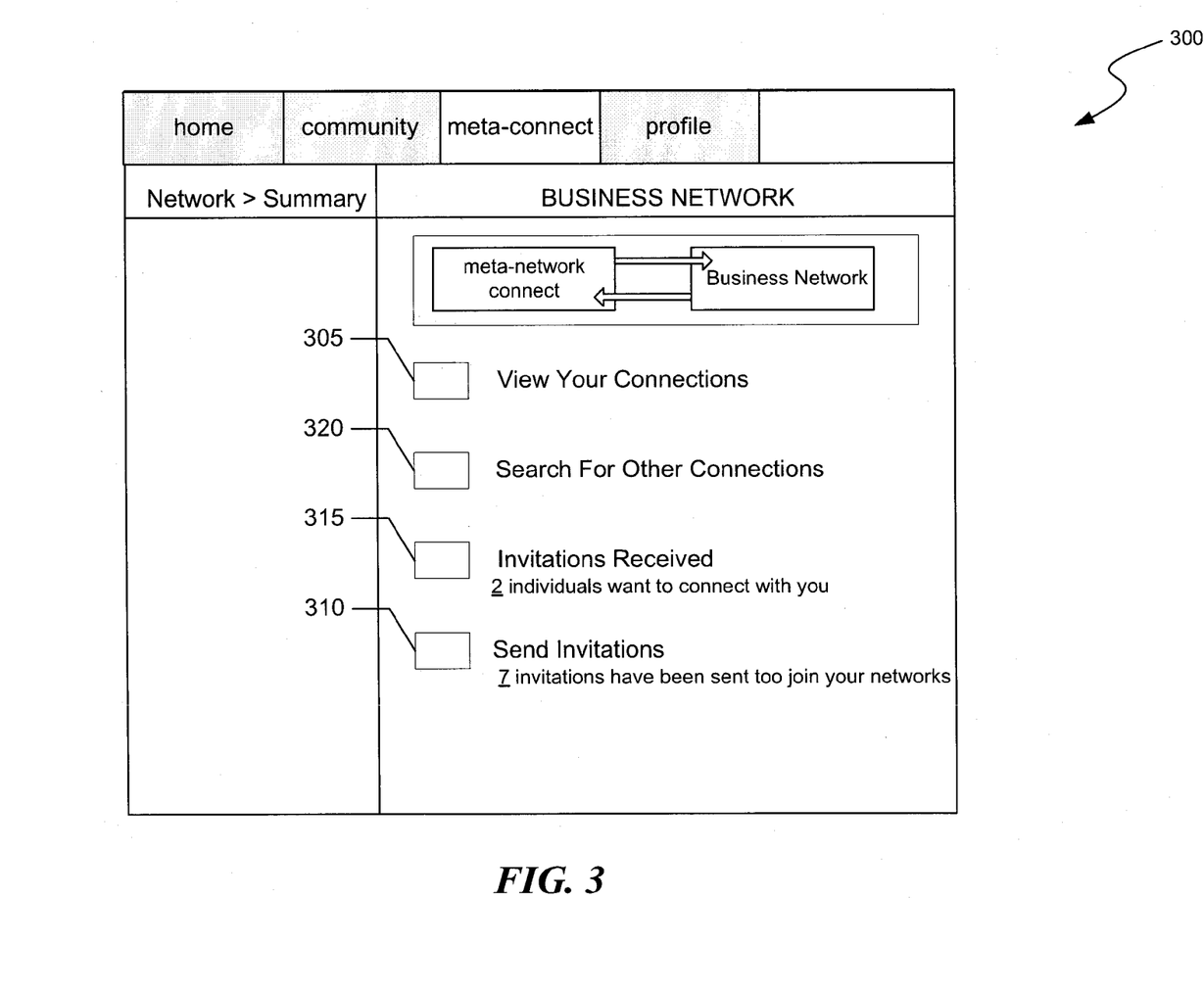
FIG. 3 illustrates a sample meta-network connection interface in one embodiment.

FIG. 3 illustrates a sample meta-connect interface 300 in one embodiment. The meta-connect interface 300 may include one or more controls. For example, as illustrated, meta-connect interface 300 includes a control 305 that enables a user 105 to view his or her relationships that are established in other networks 110. The meta-connect interface 300 also includes a control 310 that enables a user to invite other users to establish a relationship with the user, and a control 315 that enables the user to view received invitations. In some embodiments, the meta-connect interface 300 includes a control 320 that enables a user to search for other registered users across networks 110. The meta-network connection interface may include other controls and/or interfaces not mentioned here.

Figure 4:
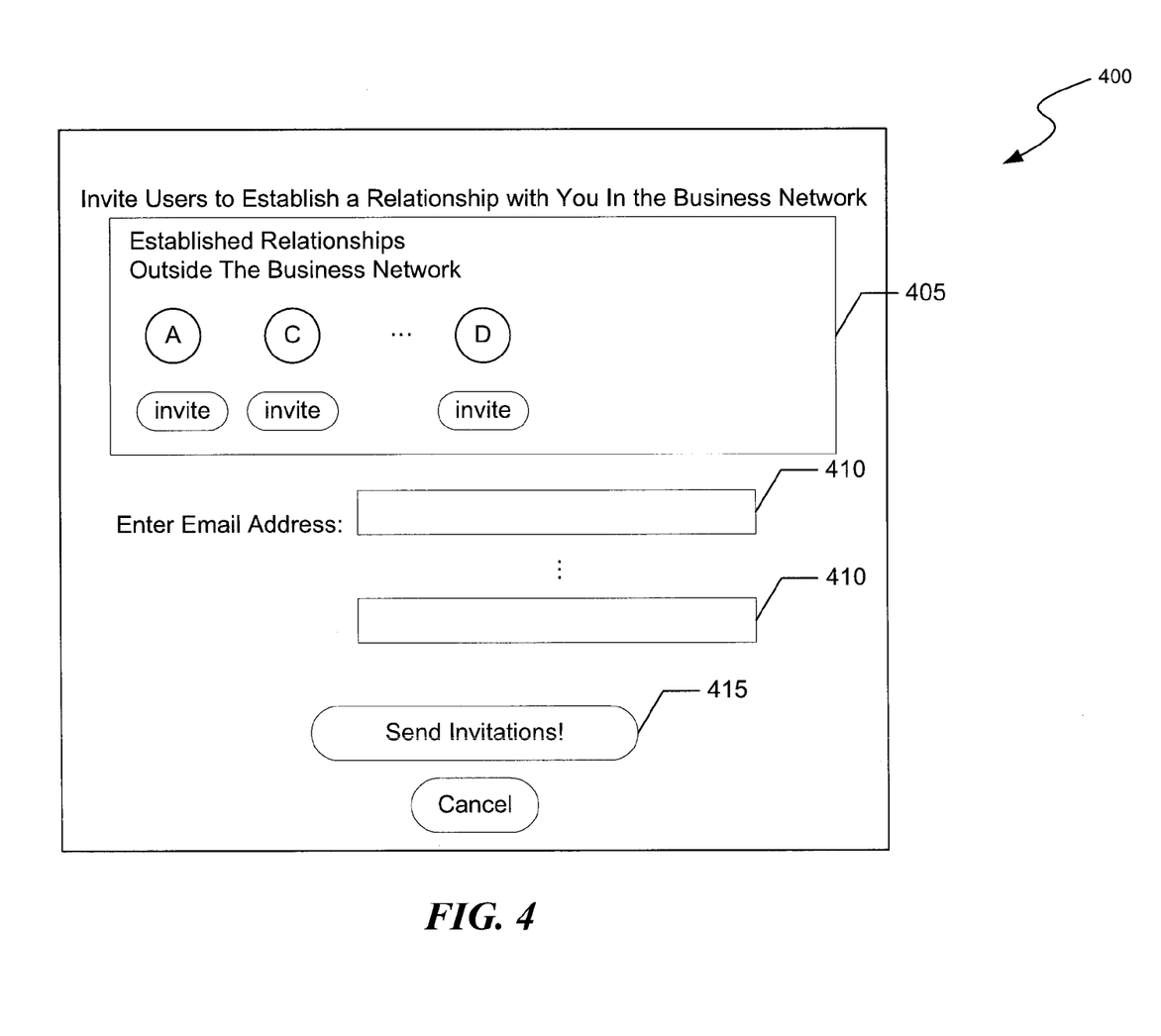
FIG. 4 illustrates a sample user interface presented to a user to enable the user to invite one or more users to establish a relationship with the user in a network, in one embodiment.

FIG. 4 illustrates a sample user interface 400 that may be presented to a user to invite one or more users to establish a relationship with the user in one embodiment. User interface 400 includes an element 405 that indicates the users 105 with which relationships have been established outside of the business network 110b. Note, however, that such users may or may not be registered with the meta-network 100. As illustrated in FIG. 4, at time T2, users 105a, 105c, and 105d are identified to user 105b as other users with which user 105b may desire to establish a business relationship. Other users with which no relationship is currently established may also be invited. For example, such a user may be invited by entering an email address of the user into a text box 410 and selecting control 415.

Figure 5:
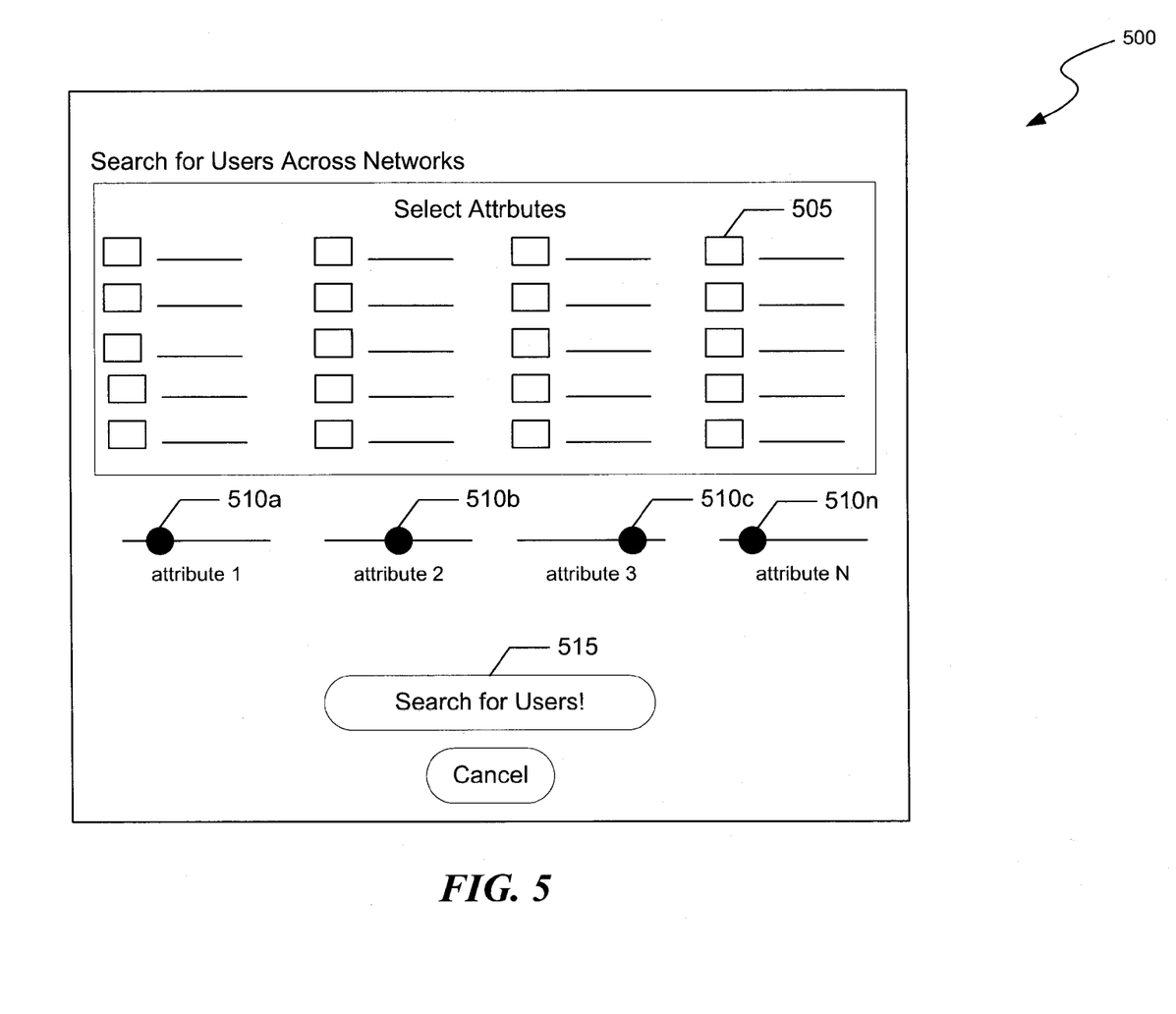
FIG. 5 illustrates a sample user interface presented to a user to enable the user to search for other users across any network registered with the meta-network in one embodiment.

In some embodiments described herein, the meta-network 100 enables a user 105 to search networks 110 for other registered users that satisfy a number of attributes specified by the user's search. FIG. 5 illustrates a sample user interface 500 presented to a user to search for users across multiple networks 110 in one embodiment. The user may specify an attribute, for example, by selecting a control 505 associated with the attribute. As another example, the user may select a control associated with a text box (not shown) and enter a keyword or phrase attribute.

In some embodiments, a user may weight the selected attributes to indicate the attributes' importance to the user's search. As illustrated in FIG. 5, the user may change the position of a control 510 on a slider bar to manipulate the importance of the attribute to the user's search. For example, by moving control 510c all the way to the right, Jill may indicate that it is very important to her that identified suppliers only use organic wheat.

The meta-network 100 identifies users matching the specified attributes and determines a similarity measure for each of the identified users. The similarity measure may be a weighted average of a distance between the specified values of the attributes and the values of the attributes for a user. For example, the sliders may indicate weights of 0.25, 0.5, and 1.0 for the business type, location, and product attributes, respectively. If Jack has corresponding attribute values of wholesale, Seattle, and organic wheat, the distances may be 1.0, 0.8, and 1.0, respectively. The weighted average may be 1.0*0.25+0.5*0.8+1.0*1.0=1.65, which may be normalized to a number in the range of 1 to 100.

Figure 6:
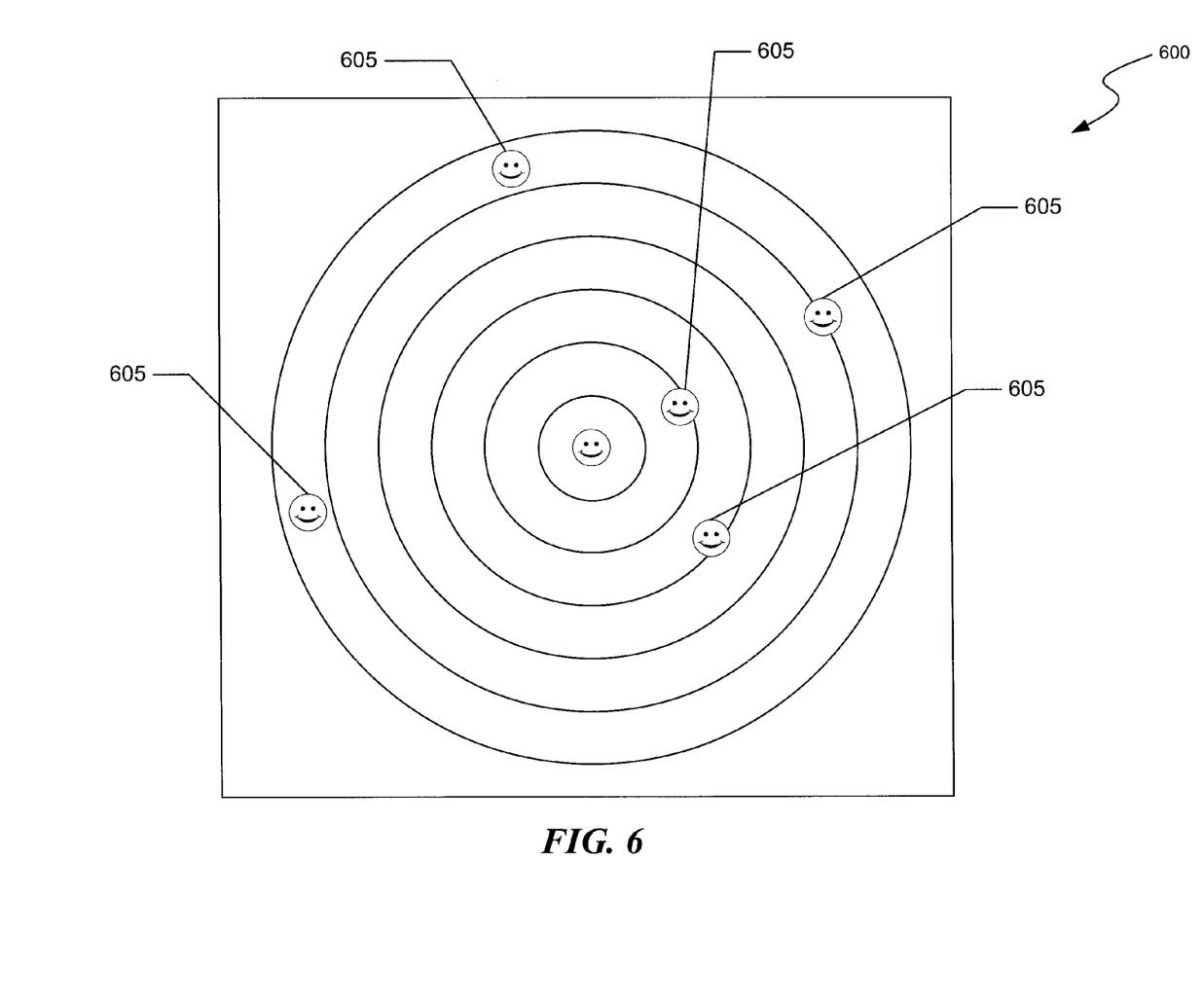
FIG. 6 illustrates a sample user interface presented to a user in response to a search in one embodiment.

In some embodiments, a mapping interface based on the determined similarity measures is displayed so that the user can visually assess how closely each of the identified users match the specified attributes. The mapping interface enables the user to navigate to the profiles of the displayed users. In some embodiments, the mapping interface allows the user to invite one or more of the displayed users to establish a relationship with the user. FIG. 6 illustrates a sample mapping interface 600 presented to a user in response to a search in one embodiment. The mapping interface 600 allows the user to review the users 605 having a similarity measure within the specified attribute range. For example, the meta-network identifies a number of users 605 that match the specified attributes, including Jack and John. As illustrated, Jack (with a score of 91) closely matches the specified attributes as compared to John (with a score of 25).

Figure 7:
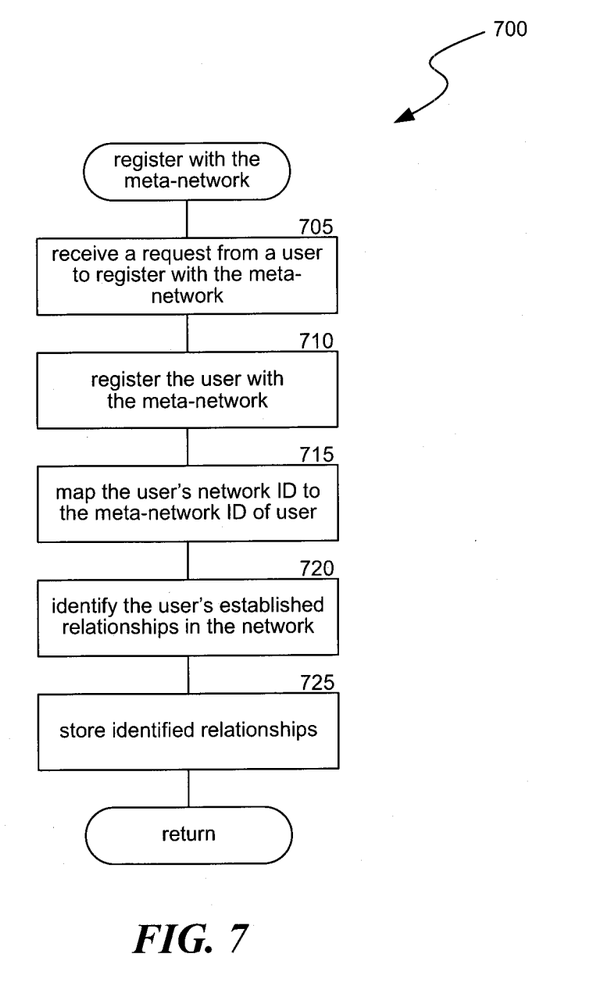
FIG. 7 is a flow diagram that illustrates a process used to register a user with the meta-network in one embodiment.

FIG. 7 is a flow diagram that illustrates a process 700 used to register a user 105 with the meta-network 100 in one embodiment. In some embodiments, the process 700 is performed by meta-network management application 120.

At block 705, the process receives a request from a user 105 to register with the meta-network 100. For example, the request may be received in response to the user 105b selecting control 205 of interface 200. As another example, the request may be received in response to a user that is not currently registered with the meta-network accepting an invitation to establish a relationship with a registered user 105 in a network 110, as described herein.

At block 710, the process registers the user with the meta-network. Details regarding registration are known and well documented, and thus need not be described in detail in order to gain an understanding of the concepts and operation of the process introduced herein. In some embodiments, the user is automatically registered with the meta-network based on a user's profile that is accessible to the meta-network through the network 110. While in other embodiments, the user manually enters all or a portion of the profile information used to register the user.

At block 715, the process maps the user's network ID to the assigned meta-network ID of user. For example, because user 105b initiates the registration process through the business network 110b, the business network identifier of user 105b ("B-BN") is mapped to the assigned meta-network ID of user 105b.

At block 720, the process identifies the relationships that the user 105 has already established in the network 110. For example, if user 105b registers with the meta-network 100 through the business network 110b, the process will not identify any relationships because user 105b has not established any relationships in the business network 110b at time T2. At a block 725, the process stores the identified relationships. After block 725, the process returns.

Figure 8:
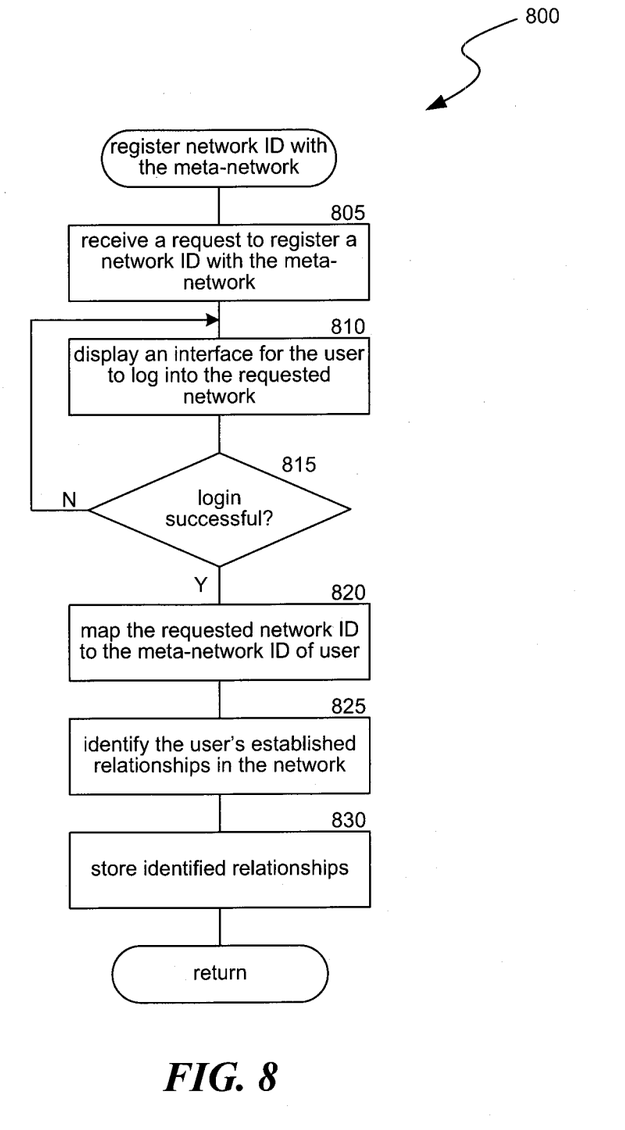
FIG. 8 is a flow diagram that illustrates a process used to register a network identifier of user with the meta-network in one embodiment.

After a user 105 has registered with the meta-network 100, the user may register other network IDs of the user with the meta-network. In some embodiments, the registration process 700 includes registering other network IDs of the user with the meta-network. FIG. 8 is a flow diagram that illustrates a process 800 used to register a network identifier of a user 105 with the meta-network 100 in one embodiment. To facilitate description, it is assumed that after user 105b registers with the meta-network 100 as described in connection with FIG. 7, user 105b registers his or her social network ID ("S-BN") with the meta-network.

At block 805, the process receives a request to register a network ID with the meta-network. For example, the request may be in response to the user 105 selecting from a list of networks 110, those networks with which the user is registered and desires to register with the meta-network 100. At block 810, the process displays an interface for the user to log into the requested network.

At block 815, the process determines whether the login was successful. If the login was successful, the process continues at block 820. Otherwise, the process returns to block 810. In some embodiment (not shown), if a threshold number of login failures is detected, the process ends. In such embodiments, an error may be displayed to the user and/or logged for further processing.

At block 820, the process maps the requested network ID to the meta-network ID of the user. For example, as shown in FIG. 1B, user 105b is assigned meta-network ID 2, which is mapped to the social network ID of user 105b ("B-SN") and to the business network ID of user 105b ("B-BN").

At block 825, the process identifies the user's established relationships in the mapped network. For example, as shown in FIG. 1B, at time T2, user 105b has established relationships in the social network 110a with users 105a, 105c, and 105d. At block 830, the process stores the identified relationships. After block 830, the process returns.

Figure 9:
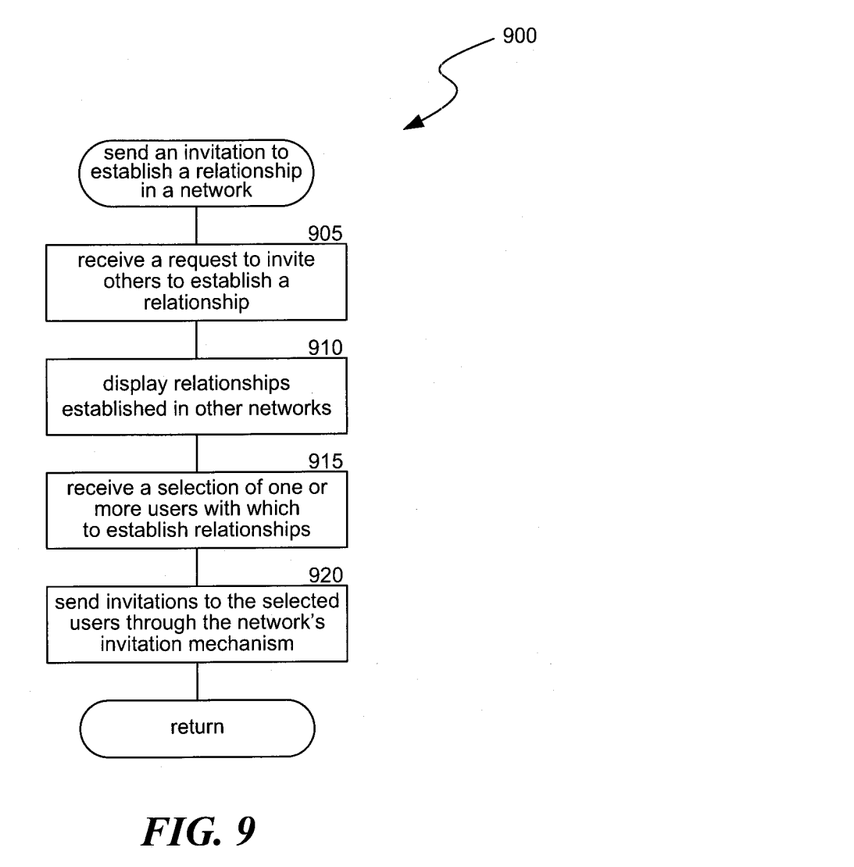
FIG. 9 is a flow diagram that illustrates a process used to invite one or more users to establish a relationship with the user in a network, in one embodiment.

After a user 105 has registered each of the user's network IDs with the meta-network 100, the user may invite other users to establish a relationship with the user in any of the user's networks 110. FIG. 9 is a flow diagram that illustrates a process 900 used to invite a user to establish a relationship in one embodiment.

At block 905, the process receives a request to invite one or more users to establish a relationship. Such a request may be received, for example, when a user 105*b* navigates to the meta-connect interface 300 and selects control 310.

At block 910, the process displays an indication of users 105 with which relationships have been established in other networks 110. For example, FIG. 4 illustrates a sample user interface 400 that may be presented to a user to invite one or more users to establish a relationship with the user in one embodiment.

At block 915, the process receives a selection of one or more users with which the user desires to establish a relationship in a network 110.

At block 920, the process sends an invitation to the one or more selected users. The invitation is sent using either a provided email address or ID of the user through the conventional invitation mechanism of the network 110 from which the meta-network is accessed. For example, user 105*b* may invite user 105*a* and user 105*d* to establish a relationship with user 105*b* in the business network 110*b*. The invitation may be sent using the invitation mechanism of the business network 110*b* and the social network ID of user 105*a* ("A-SN") and user 105*d* ("D-SN").

In some embodiment (not shown), the process may determine whether one or more of the selected users are registered with the network 110. In such embodiments, when a selected user is registered with the network 110 (such as, e.g., user 105*d*) the process may send the invitation using the network ID of the user (e.g., "D-BN"). After block 920, the process returns.

Figure 10:
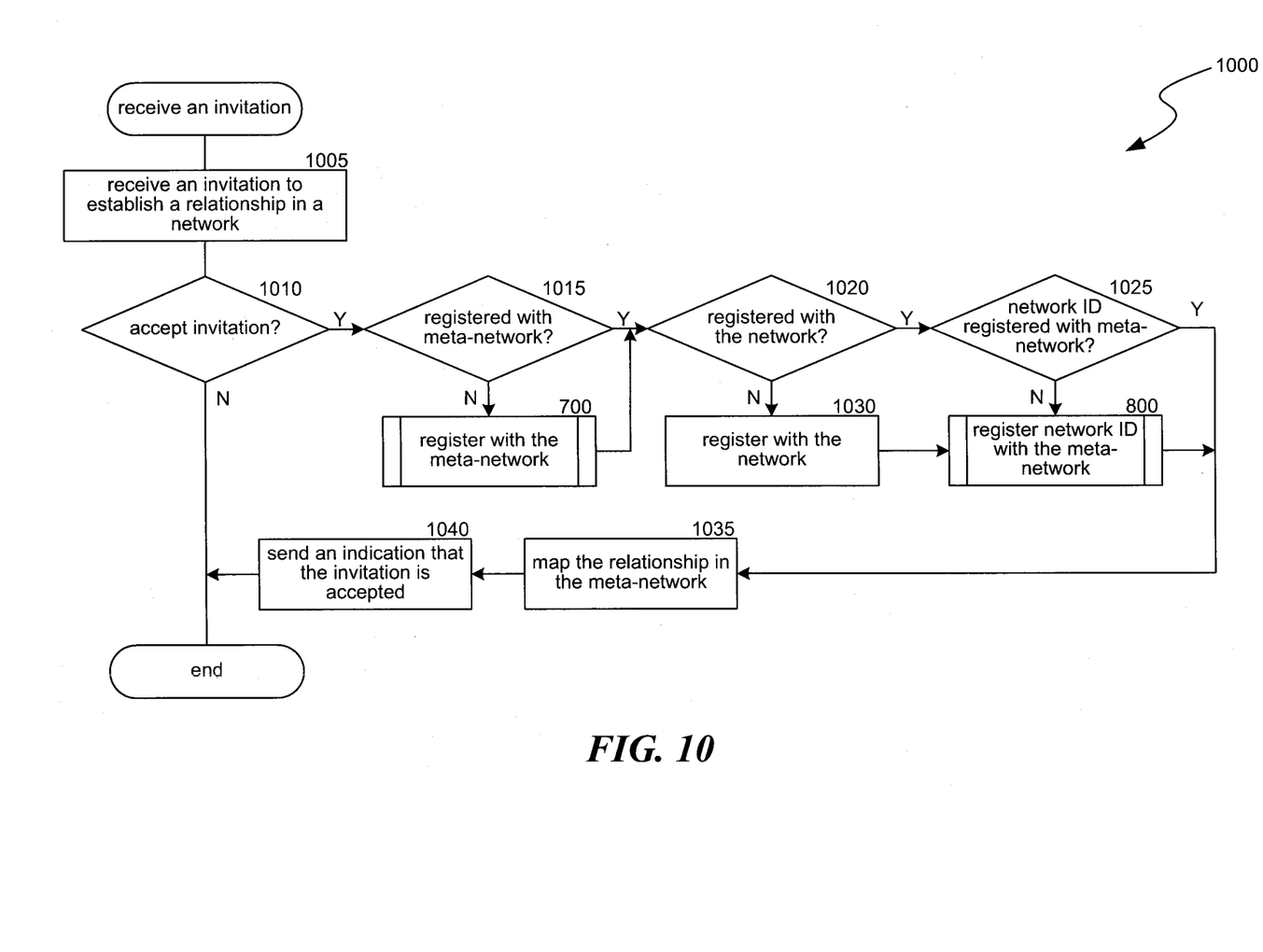
FIG. 10 is a flow diagram that illustrates a process used to respond to a received invitation in one embodiment.

FIG. 10 is a flow diagram that illustrates a process 1000 used to respond to a received invitation in one embodiment. To facilitate description, it is assumed that users 105*a* and 105*d* receive an invitation from user 105*b* to establish a relationship in the business network 110*b* (see, e.g., FIG. 1C).

At block 1005, an invitation to establish a relationship is received. For example, an email comprising the invitation may be received by user 105*a*. As another example, an invitation may be received at the network 110*b* and stored such that when user 105*d* logs into the business network 110*b* an indication of the invitation is displayed (e.g., control 315 of interface 300 may include an indication of received invitations).

At block 1010, the process determines whether the invitation is accepted. If the invitation is accepted, the process continues at block 1015. Otherwise, the process ends.

At block 1015, the process determines whether the recipient is registered with the meta-network 100. For example, the process determines whether a meta-network ID is mapped to a network ID and/or an email address of the recipient. As illustrated in FIG. 1B, at time T2, user 105*d* is registered with the meta-network and user 105*a* is not registered. If the recipient is registered with the meta-network, the process continues at block 1020. Otherwise, the recipient registers with the meta-network through the process 700, and then the process continues at block 1020.

At block 1020, the process determines whether the recipient is registered with the network 110 for which the invitation is received. If the recipient is registered with the network 110, the process continues at block 1025. Otherwise, the recipient registers with the network 110 at block 1030. After block 1030, the recipient registers the network ID with the meta-network 100 through the process 800, and then the process continues at block 1035.

At block 1025, the process determines whether the network ID of the recipient is registered with the meta-network 100. For example, this may be accomplished by determining whether the meta-network ID of the recipient is mapped to a network ID of the network 110. If it is, the process continues at block 1035. Otherwise, the process registers the network ID with the meta-network through the process 800, and then the process continues at block 1035.

At block 1035, the process stores the relationship in the meta-network 100. For example, table 135 of FIGS. 1B and 1C illustrate information stored by the meta-network 100, at times T2 and T3, describing the relationships of user 105*b* in the business network 110*b*.

At block 1040, the process sends an indication that the invitation is accepted. For example, the indication may be included in an email that is sent to user 105*b*. As another example, screen names associated with users 105*a* and 105*d* may be added to a list of 105*b*'s connections in the business network 110*b*. After block 1040, the process ends.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A system comprising:
   a memory storing computer-executable instructions of:
   a user registration component of a meta-network configured to register a user with the meta-network;
   a network registration component of the meta-network configured to register with the meta-network a first network identifier (ID) of the user corresponding to a first network to which the user is registered and a second network ID of the user corresponding to a second network to which the user is registered;
   an identification component of the meta-network configured to, after the first network ID has been registered with the meta-network, identify using the first network ID one or more users that are registered to the first network with which the user has established a relationship in the first network but has not established a relationship in the second network;
   an interface component of the meta-network configured to display the identified users; and
   an invitation component of the meta-network configured to receive a selection of the identified users and send an invitation to invite the selected users to establish a relationship with the user in the second network; and
   a processor that executes the computer-executable instructions stored in the memory.

2. The system of claim 1 wherein the meta-network stores information describing the user, a plurality of networks to which the user belongs, and relationships that the user has established in the plurality of networks.

3. The system of claim 1 further comprising an email component configured to receive at least one email address and send an invitation to a user associated with the at least one email address.

4. The system of claim 1 wherein the first network is the meta-network.

5. The system of claim 1 further comprising a search component configured to receive one or more user-specified attributes and identify users that are registered with a plurality of networks and that satisfy the user-specified attributes.

6. The system of claim 5 wherein the one or more user-specified attributes are weighted to indicate a level of importance.

7. A method for providing relationship information across multiple networks, the method comprising:
 providing a meta-network through which users register their affiliations with the multiple networks;
 receiving from a user a request to invite other users to establish a relationship with the user in a second network of the multiple networks;
 identifying relationships that the user has established with other users in the multiple networks, each relationship in a first network between the user registered with the first network and another user registered with the first network such that the user and the other user do not have a relationship in the second network;
 displaying the identified relationships with the other users so that the user can view relationships across multiple networks without the user having to access each network separately;
 receiving from the user a selection of one of the other users; and
 sending an invitation to the selected other user to establish a relationship with the user in the second network.

8. The method of claim 7 wherein the identifying relationships includes accessing the multiple networks to retrieve relationship information and storing the retrieved relationship information in a data store of the meta-network.

9. The method of claim 8 including periodically re-accessing the multiple networks to update the relationship information.

10. The method of claim 7 further comprising, receiving an invitation to establish a relationship with another user in a distinguished network with which the user is not registered;
 registering the user with the distinguished network;
 mapping a meta-network ID of the user to a distinguished network ID of the user corresponding to the distinguished network; and
 establishing a relationship with the other user in the distinguished network.

11. The method of claim 7 wherein the meta-network is one of the multiple networks.

12. The method of claim 7 further comprising, in response to receiving a request to identify users satisfying one or more user-specified attributes, identifying at least one user registered with the meta-network that satisfies the one or more user-specified attributes; and displaying the at least one identified user.

13. The method of claim 12 wherein the one or more user-specified attributes are weighted to indicate a level of importance.

14. A computer-readable memory comprising instructions that, when executed by a computer system, cause the computer system to:
 assign a user a meta-network identifier (ID);
 map the assigned meta-network ID to a first network ID corresponding to a first network to which the user is registered and a second network ID corresponding to a second network to which the user is registered;
 identify using the network ID one or more users that are registered in the first network and with which the user has established a relationship in the first network;
 receive a selection of the identified users; and
 send an invitation to invite the selected users to establish a relationship with the user in the second network with which the user is registered.

15. The computer-readable memory of claim 14 further comprising instructions that cause the computer system to:
 in response to receiving an indication that at least one of the selected users has accepted the invitation, establish a relationship with the at least one selected user in the second network.

16. The computer-readable memory of claim 14 further comprising instructions that cause the computer system to receive an invitation to establish a relationship with another user in a distinguished network with which the user is not registered;
 register the user with the distinguished network;
 map the meta-network ID of the user to a distinguished network ID of the user corresponding to the distinguished network; and
 store a mapping of the relationship in the meta-network.

17. The computer-readable memory of claim 16 further comprising instructions that cause the computer to send an indication that the received invitation is accepted.

18. The computer-readable memory of claim 14 wherein the second network is the meta-network.

19. The computer-readable memory of claim 14 further comprising instructions that cause the computer system to receive from the user one or more user-specified attributes;
 identify at least one user registered with the meta-network that satisfies the user-specified attributes; and
 display the at least one identified user.

20. The computer-readable memory of claim 19 wherein the one or more user-specified attributes are weighted to indicate a level of importance to the user.

21. The system of claim 1 wherein the relationship in the first network between the user and an identified user is established based on an invitation to join the first network and to establish a relationship in the first network.

* * * * *